United States Patent
Xie et al.

(10) Patent No.: US 7,355,551 B2
(45) Date of Patent: Apr. 8, 2008

(54) METHOD FOR A SPACE-EFFICIENT GPS RECEIVER

(75) Inventors: Gang Xie, Tempe, AZ (US); Rahul Vohra, Chandler, AZ (US); Xiang Yuan, Chandler, AZ (US)

(73) Assignee: SiRF Technology, Inc., San Jose, CA (US)

(*) Notice: Subject to any disclaimer, the term of this patent is extended or adjusted under 35 U.S.C. 154(b) by 0 days.

(21) Appl. No.: 11/368,917

(22) Filed: Mar. 6, 2006

(65) Prior Publication Data
US 2007/0205942 A1 Sep. 6, 2007

(51) Int. Cl.
*G01S 5/02* (2006.01)
(52) U.S. Cl. .............................. 342/357.13; 342/357.12
(58) Field of Classification Search ........... 342/357.06, 342/357.12, 357.13, 357.15; 701/207, 213, 701/215
See application file for complete search history.

(56) References Cited

U.S. PATENT DOCUMENTS 6,275,185 B1*  8/2001  Loomis ................. 342/357.14
2002/0021245 A1*  2/2002  Lin et al. ............... 342/357.14
2004/0263386 A1* 12/2004  King et al. ............ 342/357.06
2006/0145917 A1*  7/2006  Miyano et al. ........ 342/357.12
2006/0208943 A1*  9/2006  Gronemeyer .......... 342/357.12

* cited by examiner

Primary Examiner—Dao Phan
(74) Attorney, Agent, or Firm—Johnathan W. Hallman; MacPherson Kwok Chen & Heid LLP (57) ABSTRACT

In a Global Positioning System (GPS) receiver, rather than storing both GPS satellite ephemeredes and almanacs to the GPS receiver's on-chip non-volatile memory, storing into the non-volatile memory only the more recent ephemeris or almanac data for each satellite. When an ephemeris expires, the parameters in the ephemeris are converted into corresponding parameters of an almanac. The ephemeris or almanac is used to determine whether a given satellite is visible to the GPS receiver. A method of the present invention allows efficient use of the memory space in the non-volatile memory. A study by the inventors shows that differences in positions and velocities of satellites estimated using aged ephemeris and almanac data associated with the same week number are insignificant.

17 Claims, 7 Drawing Sheets

METHOD FOR A SPACE-EFFICIENT GPS RECEIVER

BACKGROUND OF THE INVENTION

1. Field of the Invention

The present invention relates generally to global positioning system (GPS) technology. In particular, the present invention relates to a design of a GPS receiver.

2. Discussion of the Related Art

GPS is a satellite-based radio navigation system. Each GPS satellite, also called a space vehicle (SV), broadcasts time-tagged ranging signals and navigation data, providing signal transmit time, ephemeris (i.e., the SV's orbital parameters) and almanac (i.e., reduced-precision orbital parameters of all SV's in the GPS constellation) to GPS receivers. Each SV is identified by a unique pseudo-random noise (PRN) code that is embedded in its transmitted signal.

A GPS receiver extracts the signal transmit time from each of the satellites it tracks. For each satellite, the difference between the time the satellite's signal is received, as determined by the receiver's clock, and the time the signal is transmitted from the satellite is the apparent transit time. The apparent distance between the satellite and the GPS receiver ("pseudorange") is the product of this apparent transit time and the speed of light in a vacuum. An accurate position of the satellite can be calculated based on a valid ephemeris broadcast by the satellite. When there are four or more satellites in view of the GPS receiver, the GPS receiver can determine a 3-dimensional receiver position and the receiver clock bias relative to the GPS Time (GPST).

The GPS receiver uses ephemeredes and almanac data to search for visible GPS satellites. Typically, in a GPS receiver implemented on one or more integrated circuits, ephemeredes and almanac data are stored in a non-volatile memory circuit in one of the GPS receiver integrated circuits. Typically, an ephemeris contains a set of ephemeris parameters—valid over a short period of time (e.g., 4 hours)—that enable calculating the satellite's positions and velocities as a function of GPS time. Each GPS satellite broadcasts its own ephemeris as 16 Keplerian parameters as follows: (a) "toe", which is the reference time of the ephemeris; (b) "$M_o$", which is the mean anomaly at the reference time of the orbit; (c) "$\Delta n$", which is the mean motion correction from a computed orbit, (d) "e", which is the eccentricity of the orbit, (f) "$A^{1/2}$", which is the square root of the semi-major axis of the orbit, (g) "$\Omega_o$", which is a longitude of an ascending node of the orbit plane at a weekly epoch, (h) "$i_o$", which is an inclination angle at reference time, (i) "$\omega$", which is an argument of the perigee of the orbit, (j) "$\dot{\Omega}$" ("Omega-dot"), which is a rate of change of a right ascension, (k) "$\dot{i}$" ("I-dot"), which is a rate of change of an inclination angle, and (l) "$C_{uc}$", "$C_{us}$", "$C_{rc}$", "$C_{rs}$", "$C_{ic}$", and "$C_{is}$", which are amplitudes of various harmonic corrections. In addition, an identifying number, called "IODE" ("Issue of Data (ephemeris)"), is assigned to each ephemeris.

Each satellite broadcasts a new ephemeris parameter set every two hours or so. An ephemeris parameter set is regarded as current, valid, or unexpired typically within the time window of ±2 hours of its reference time. Beyond this time window, the accuracies of the satellite's position and velocity, as calculated from this ephemeris, decrease. Thus, the ephemeris is typically regarded as expired outside of the time window.

Each satellite also broadcasts an almanac that gives ephemeris data at reduced precision for all satellites in the constellation (32) of GPS satellites. The time required for a satellite to transmit and for a GPS receiver to receive a complete set of almanac is 12.5 minutes. The almanac data for each satellite includes the following 8 parameters: (a) "toa", which is reference time of the almanac, (b) "$M_o$", which is the mean anomaly at reference time of the satellite orbit, (c) "e", which is the eccentricity of the orbit, (d) "$A^{1/2}$", which is the square root of the semi-major axis of the orbit, (e) "$d_i$", which is a value that equals $I_o$-0.3$\pi$, (f) "$\omega$", which is an argument of perigee, and (g) "$\dot{\omega}$" ("Omega-dot"), which is a rate of change of a right ascension. A satellite's position and velocity that are calculated from almanac data are less accurate than those calculated from an ephemeris received from the satellite. However, almanac data is typically regarded as valid for a much longer time than ephemeris data. In fact, almanac data that is up to 2 years old can still be used to determine a satellite's visibility. Typically, a week number is often attached to an almanac or ephemeris parameter set. This week number is often used to help determine whether or not the almanac or ephemeris is current (i.e., unexpired).

A GPS receiver can use ephemeris or almanac data to determine approximately when a satellite would rise above the horizon, given an approximate user position and time. When ephemeredes are unavailable or have expired, almanac data is often used to initiate a search list of possible visible satellites. The rough satellite positions and velocities calculated from almanac or ephemeris data reduce the time-to-first-fix (TTFF), as the GPS receiver starts up.

To meet demands of a GPS receiver starting under different conditions, the GPS receiver typically saves both ephemeredes and almanac data from the satellites in its on-chip non-volatile memory (e.g., an battery backed-up SRAM). So that, whenever the GPS receiver powers up from a previous shut-down, either an unexpired ephemeris or a valid almanac is available to estimate each satellite's position, so as to generate a list of visible satellites to search for.

In an advanced GPS receiver, information provided to a GPS receiver to assist it to acquire satellites is often also saved on the same non-volatile memory, which has become a scarce resource. In some designs, it may become necessary to restructure the GPS receiver hardware to obtain more space in the non-volatile memory. A space-efficient design is highly desirable.

SUMMARY

According to one embodiment of the present invention, a method in a GPS receiver saves non-volatile memory space by not storing almanac data for those satellites for which an up-to-date ephemeris is already available in the GPS receiver. That is, a method of the present invention saves on-chip non-volatile memory space by storing in the non-volatile memory, for each satellite, either an up-to-date ephemeris of each satellite, or up-to-date almanac data, but not both.

In one embodiment of the present invention, when more up-to-date ephemeris or almanac data for a satellite becomes available, the data is stored onto the GPS receiver's non-volatile memory. When the GPS receiver computes a satellite's position to estimate the satellite's visibility, the more up-to-date ephemeris or almanac of the satellite is used. Ephemeredes and almanacs are typically provided to the GPS receiver from satellite live signals, a source on an assisted GPS network, or some other data source.

A method according to one embodiment of the present invention includes: (a) when the GPS receiver has only an ephemeris of a satellite and does not have almanac data for that satellite, the ephemeris—whether current or not—is selected; (b) when the GPS receiver has only almanac data for a satellite and does not have an ephemeris for that satellite, the almanac data is selected; (c) when the GPS receiver has a current or unexpired ephemeris, the ephemeris is selected; (d) when the GPS receiver has both an expired ephemeris and almanac data for a satellite, the GPS receiver compare values for their week number values and selects (1) the almanac data, when the ephemeris and almanac data have the same week number value; and (2) the data with the larger week number value, when the week number values are different. In comparing the week number values, the "rollover" event for the week number is considered. Typically, a larger week number value denotes a more recent date.

In one embodiment of the present invention, data in an expired ephemeris of a satellite is used to create almanac data for the satellite, which can then be used to estimate the position and velocity of the satellite, so as to determine the satellite's visibility. The present invention provides the method to transform ephemeris parameters into almanac parameters.

The present invention is better understood upon consideration of the detailed description below and the accompanying drawings.

DETAILED DESCRIPTION OF THE PREFERRED EMBODIMENTS

A study conducted by the inventors reveals that satellite positions and velocities calculated using expired ephemeredes are about as accurate as satellite positions and velocities calculated from valid almanac data. Using current (i.e., valid, or unexpired) ephemeris, the positions and velocities of a satellite can be calculated within several meters and several meters per second, respectively. These small position and velocity errors are insignificant for the purpose of correctly predicting whether or not a satellite is visible to the GPS receiver. In the inventors' study, described in further detail below, positions and velocities calculated based on unexpired ephemeredes are used as reference values. The satellite positions and velocities calculated based on almanac data or old ephemeredes are compared to these reference values, and their differences relative to the reference values are referred to as position and velocity errors.

Figure 1:
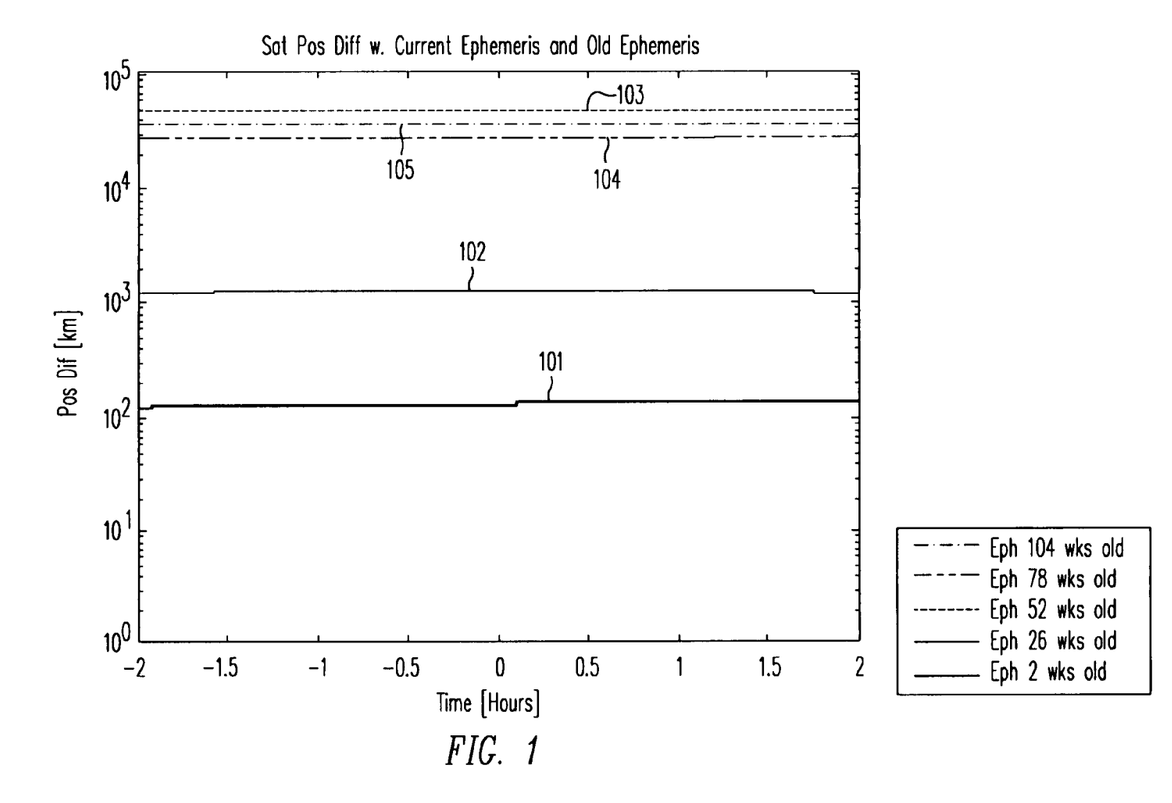
FIG. 1 shows the errors of a satellite's positions calculated based on its old ephemeredes, relative to a reference ephemeris.

FIG. 1 shows three-dimensional position errors 101, 102, 103, 104 and 105 of a satellite (PRN1), calculated using ephemeredes that are 2, 26, 52, 78 and 104 weeks old, respectively. As shown, for each expired ephemeris, the position errors at different time points within the four-hour window centered at the reference time (toe) of the reference ephemeris are relatively constant (i.e., there is not a significant degradation in accuracy over the duration of the four-hour window). In this example, ephemeredes with different reference times (toe's) are selected to avoid any potential bias on calculated position errors. The toe of the reference ephemeris is 244800 seconds, while toe's of the expired ephemeredes are 230384, 215984, 201600, 187200, and 172800 seconds (i.e., staggered at a 4-hour offset between ephemeredes).

Figure 2:
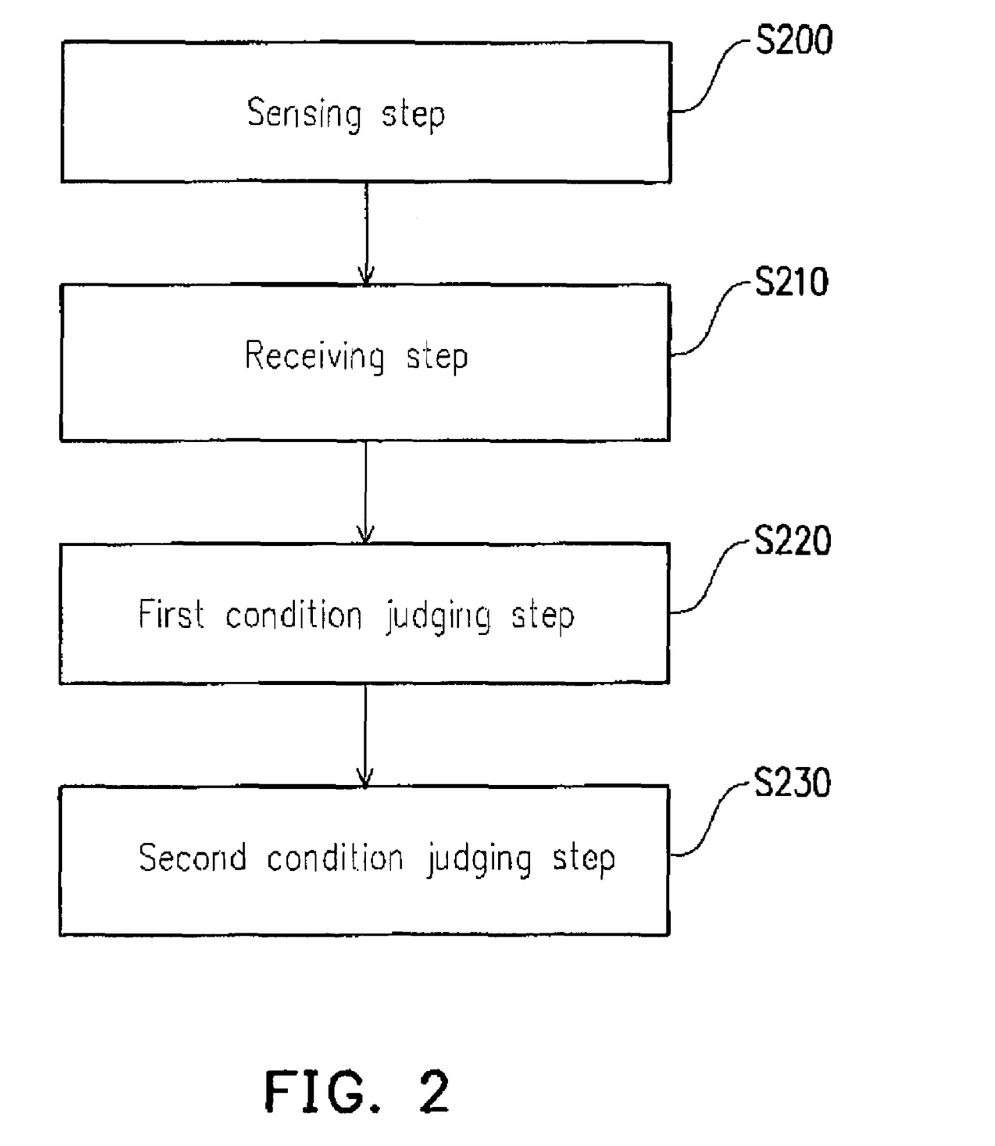
FIG. 2 shows the errors of a satellite's velocities calculated based on its old ephemeredes relative to a reference ephemeris.

FIG. 2 shows the three-dimensional velocity errors 201, 202, 203, 204 and 205 of the same satellite (PRN1), calculated using its ephemeredes with 2, 26, 52, 78 and 104 weeks old, respectively. Again for each expired ephemeris, the velocity errors at different time points within the four-hour window centered at the reference time (toe) of the reference ephemeris are also relatively constant.

Figure 3:
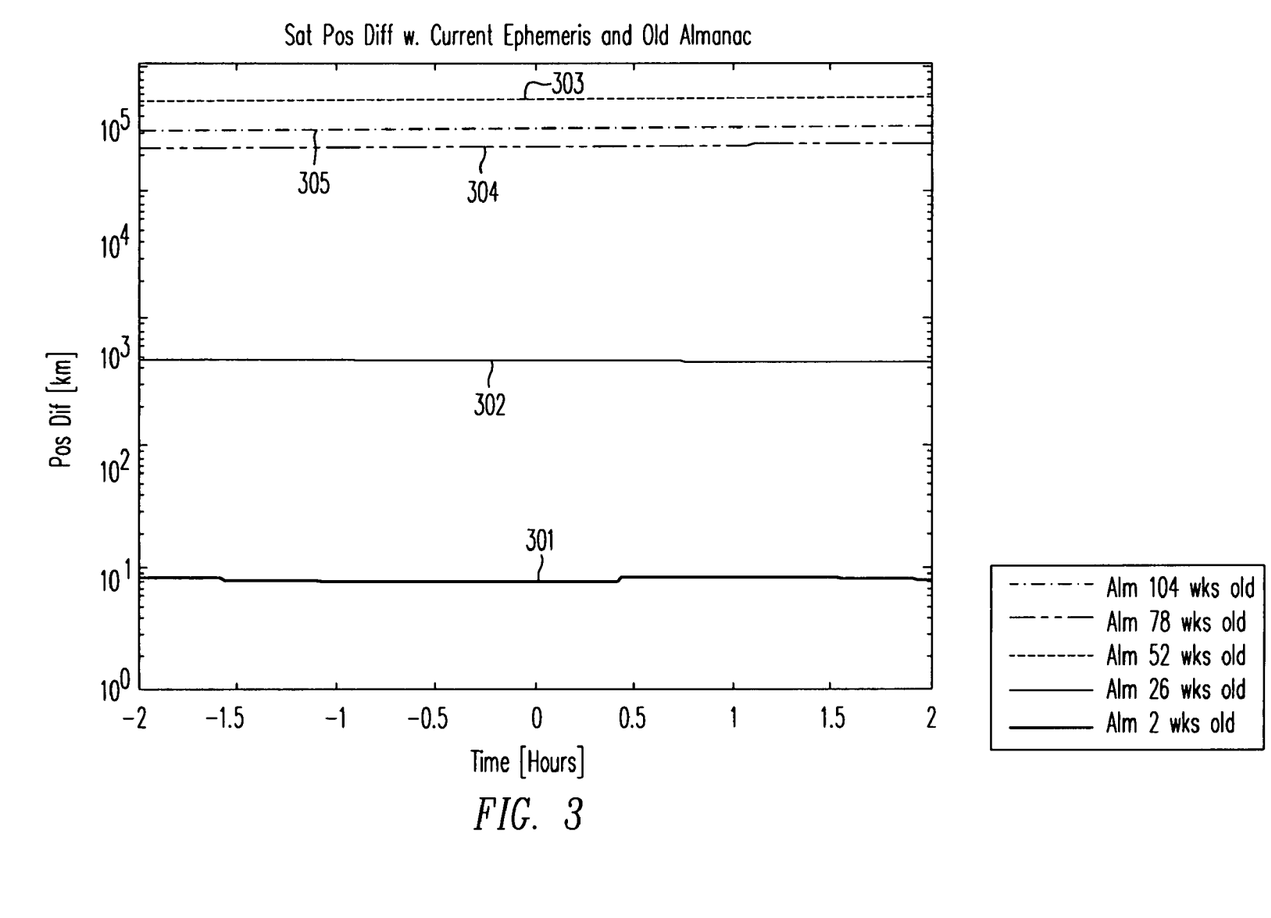
FIG. 3 shows the errors of a satellite's positions calculated based on its old almanacs, relative to a reference ephemeris.
Figure 4:
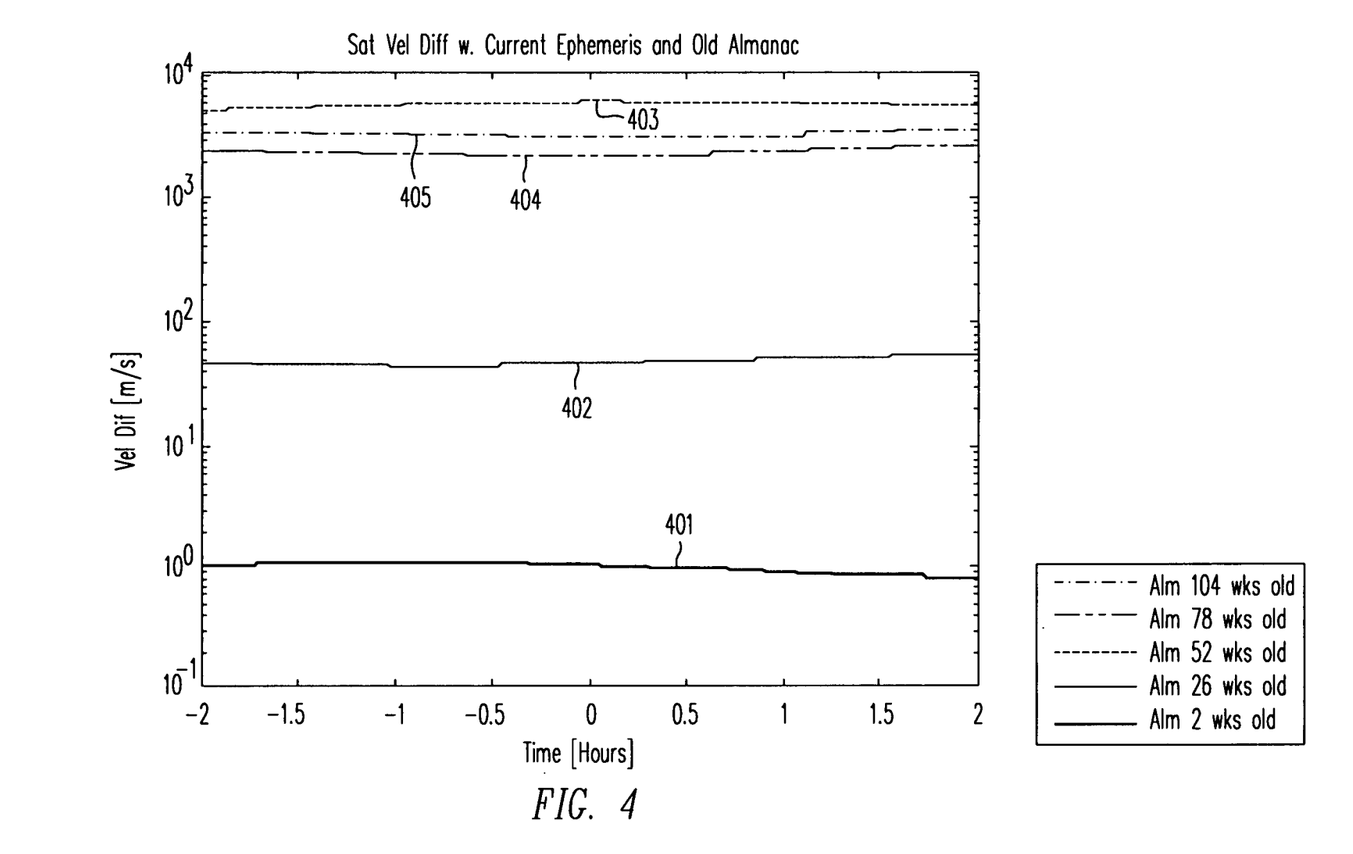
FIG. 4 shows the errors of a satellite's velocities calculated based on its old almanacs, relative to a reference ephemeris.

The results of FIGS. 1 and 2 are compared to position and velocity errors obtained using old but still unexpired almanac data. FIG. 3 shows three-dimensional position errors 301, 302, 303, 304 and 305 of the same satellite (PRN 1), calculated based on almanac data that are 2, 26, 52, 78 and 104 weeks old, respectively. Typically, such old almanac data are still regarded by practitioners as unexpired. A comparison of the position errors in FIG. 1 and FIG. 3 shows that the satellite positions calculated using old ephemeredes are roughly as accurate as those calculated using the correspondingly old almanac data. Similarly, FIG. 4 shows three-dimensional velocity errors 401, 402, 403, 404 and 405 of the same satellite (PRN 1), calculated using almanac data that are 2, 26, 52, 78 and 104 weeks old, respectively. A comparison of the errors of FIG. 2 and FIG. 4 shows that the satellite velocities calculated using old ephemeredes are roughly as accurate as those calculated using the correspondingly old almanac data.

Figure 5:
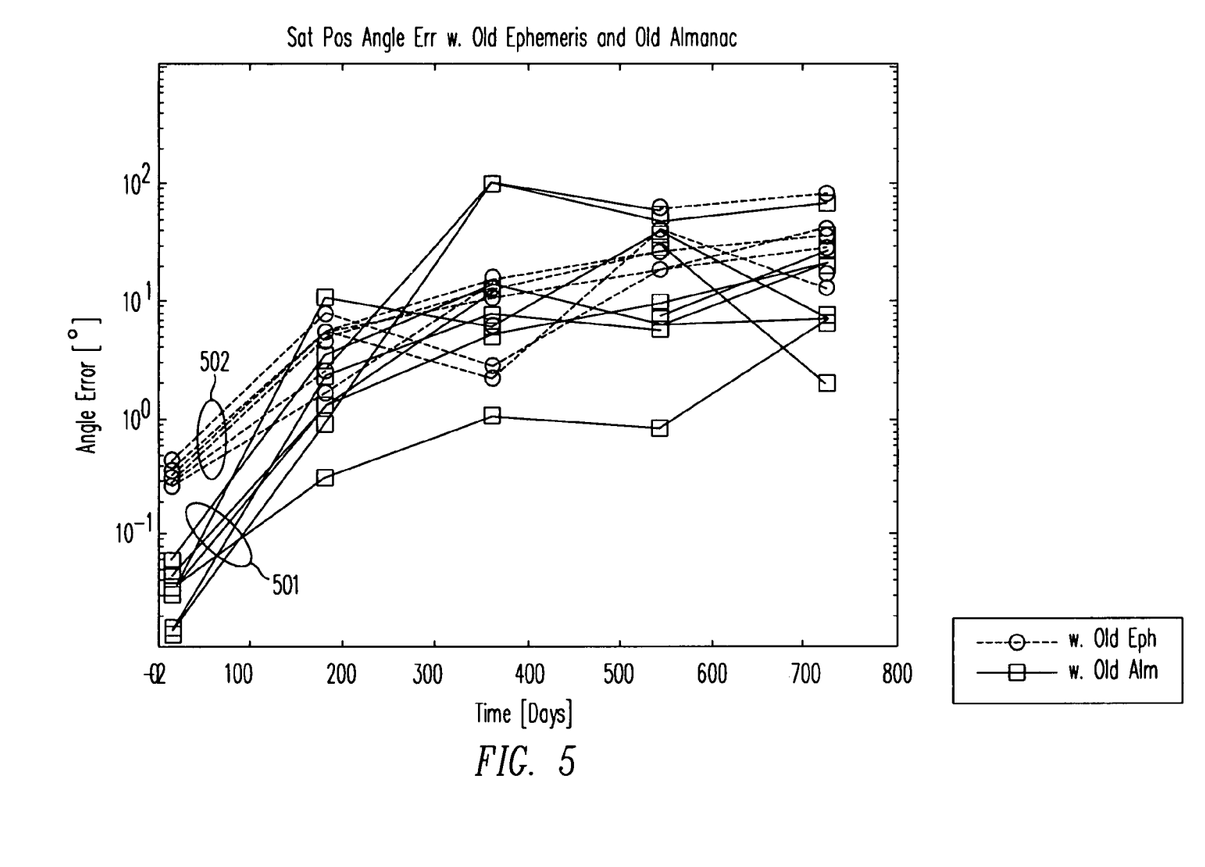
FIG. 5 shows the errors of multiple satellites' positions calculated based on their old ephemeredes and almanacs, relative to respective reference ephemeredes.

FIG. 5 shows the errors in calculating the positions of seven randomly selected satellites (PRNs 1, 6, 11, 16, 21, 26, and 30), relative to reference values calculated from current, unexpired ephemeredes, using old ephemeredes (graphs 502) and old but still valid almanac data (graphs 501). In FIG. 5, the satellite position errors, which are originally obtained as distance errors (expressed in meters), are converted to angle errors (expressed in degrees relative to the center of the orbit). The following formula is used to transform distance errors to angle errors:

Angle error=distance error/(5153*5153)*180/π[degrees]

where (5153*5153) meters is the typical length of the semi-major axis of all GPS satellite orbits. Position errors in degrees are more informative of the severalty of the position errors. Since this conversion is applied to position errors calculated from both ephemeredes and almanacs, the comparison keeps fair. As shown, the position errors due to old ephemeredes are comparable to the position errors due to old almanac data. Thus, expired ephemeredes can replace almanac data of the same age for estimating a satellite's visibility with acceptable accuracy. For example, 26-week old (i.e., 182 days or a half-year) ephemeredes and almanac data both result in position errors of less than 10 degrees. As expected, the older data generally results in larger errors. FIG. 5 also shows that position errors for 2-week old ephemeredes are consistently about ten times greater than those calculated using 2-week old almanac data. Such a difference, however, is insignificant for our purpose because (1) the errors for 2-week old ephemeredes are as small as 1 degree and (2) the 26-week old almanac data that provides a 10-degree error is still regarded as valid and are routinely used in many GPS receivers.

Figure 6:
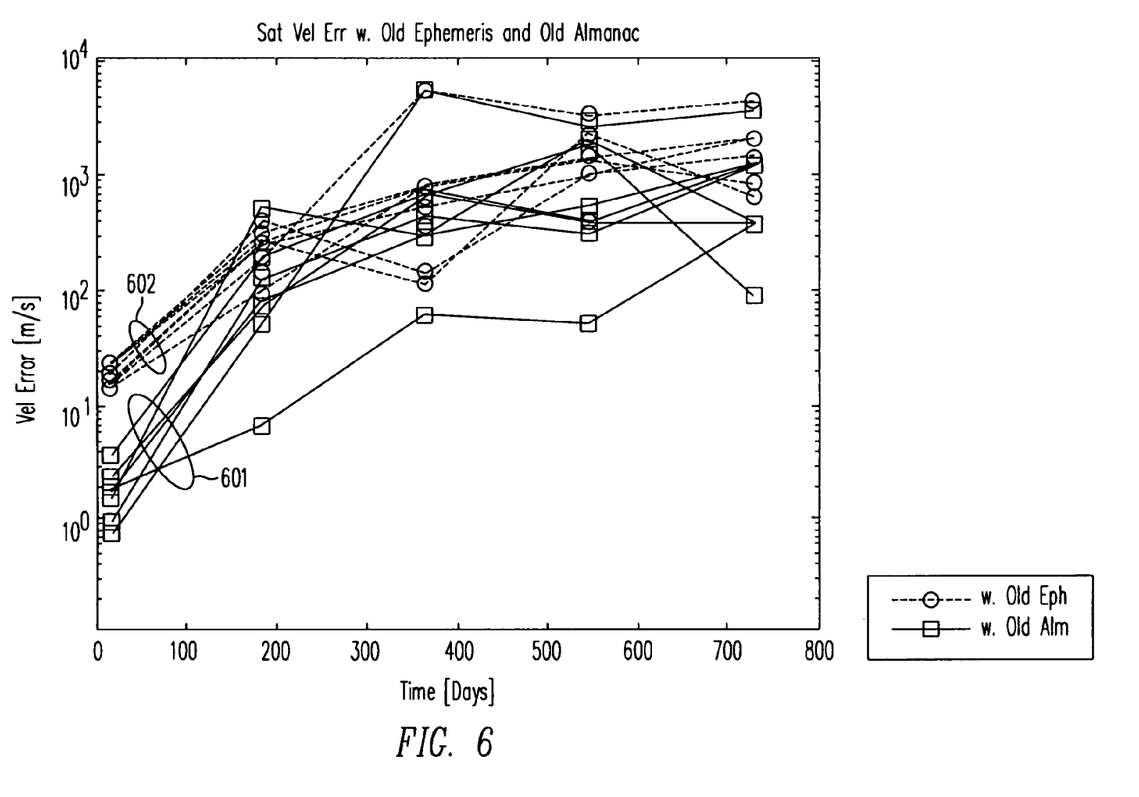
FIG. 6 shows the errors of multiple satellites' velocities calculated based on their old ephemeredes and almanacs, relative to respective reference ephemeredes.

FIG. 6 shows the velocity errors for the same set of satellites calculated using old ephemeredes (graphs 602) and old almanac data (graphs 601). No significant difference is found in velocity errors between those calculated using old ephemeredes and those calculated using the correspondingly old almanac data. The estimated velocity of a satellite is used to determine a Doppler search range for the satellite. From this study, expired ephemeredes can also replace old almanac data in estimating satellite velocity, with an acceptable accuracy.

Thus, according to one embodiment of the present invention, a GPS receiver may save non-volatile memory space by not storing almanac data for those satellites for which an up-to-date ephemeris is already available in the GPS receiver. In fact, for each satellite, the GPS receiver stores in the non-volatile memory either an up-to-date ephemeris of each satellite, or unexpired almanac data, but not both. When more up-to-date ephemeris or almanac data for a satellite becomes available, the data is stored onto the GPS receiver's non-volatile memory. When the GPS receiver computes a satellite's position to estimate the satellite's visibility, the more up-to-date ephemeris or almanac of the satellite is used. Ephemeredes and almanacs are typically provided to the GPS receiver from satellite live signals, a source on an assisted GPS network, or some other data source. In the GPS receiver, data from an expired ephemeris of a satellite may be used to create almanac data for the satellite, which can then be used to estimate the position and the velocity of the satellite, so as to determine the satellite's visibility. Thus, the present invention provides the method to transform ephemeris parameters into almanac parameters.

Figure 7:
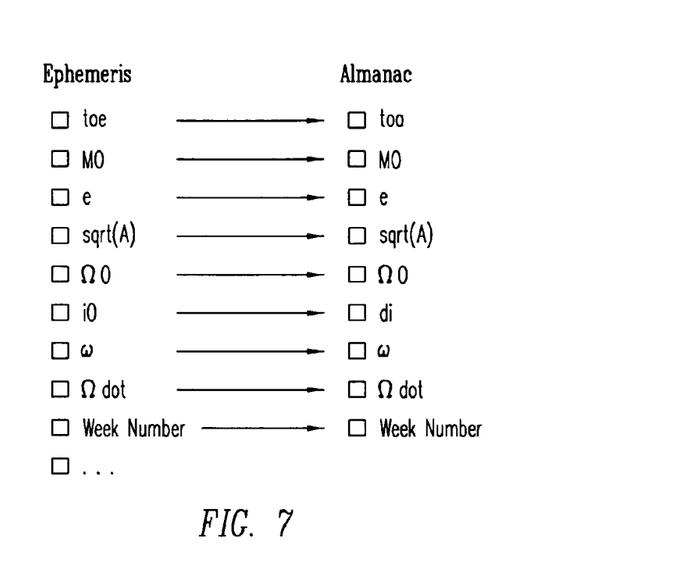
FIG. 7 illustrates the method of transforming parameters in an ephemeris to almanac parameters.

FIG. 7 shows a method for transforming an expired ephemeris into almanac data. As shown in FIG. 7, ephemeris parameters $M_O$, e, $A^{1/2}$, $\Omega_O$, $\omega$, and $\dot{\Omega}$ become almanac parameters of the same names. The ephemeris reference time (toe) becomes the almanac reference time (toa). Almanac parameter $d_i$ is obtained by subtracting $0.3\pi$ from ephemeris parameter $i_O$. The almanac data thus transformed from an expired ephemeris can be used for calculating satellite positions and velocities. In fact, the position and velocity values used in obtaining the data in FIGS. 1, 2, 5, and 6 are all obtained via this transform method. By not saving satellite almanacs onto receiver non-volatile memory, in one instance, the GPS receiver saves at least 1 kilobyte of memory space.

Figure 8:
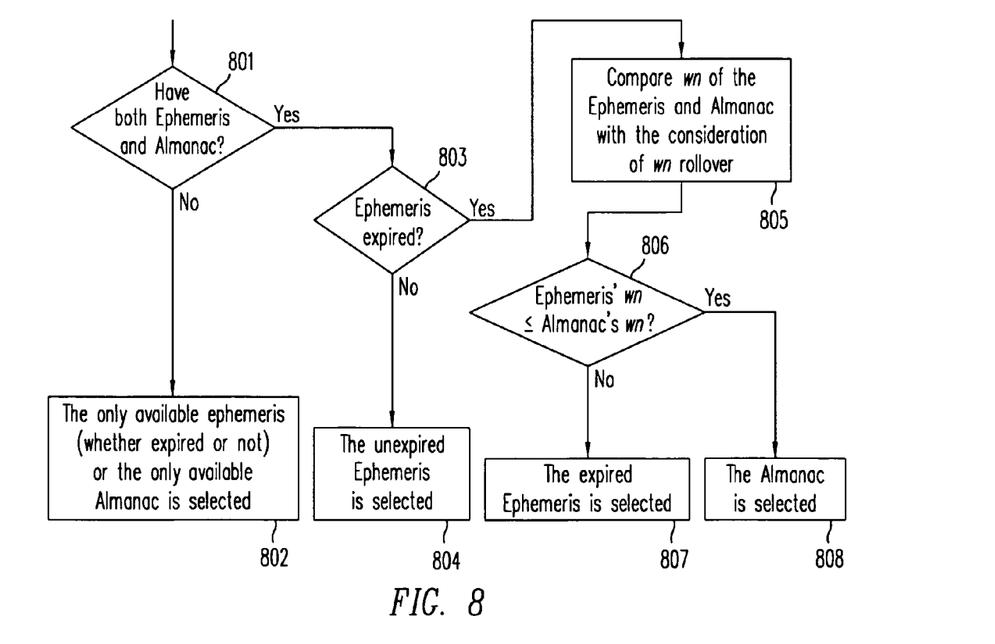
FIG. 8 illustrates a method for determining whether an ephemeris or a set of almanac data is more up-to-date.

FIG. 8 illustrates a method for determining whether an ephemeris or an almanac is more up-to-date. In a GPS receiver, the ephemeredes and almanac data are obtained by: (a) restoring from the receiver's non-volatile memory, (b) decoding satellite live signals, (c) receiving from an assisted-GPS computer network, or any other suitable source. Only the most up-to-date ephemeris or almanac data is stored into the non-volatile memory of the GPS receiver prior to the GPS receiver shutting down, and only the more up-to-date ephemeris or almanac data is used to estimate the satellite's visibility. Note the same selection rules are applied to each GPS satellite, and different satellites may have a different selection result. As shown in FIG. 8, the selection rules under this method are provided as follows:

At step 801, when a GPS receiver determines (at step 801) that it has only an ephemeris of a satellite and does not have any almanac data (at step 802) for that satellite, the ephemeris data is selected for estimating the satellite's position and velocity or for being stored, regardless of whether or not the ephemeris is current (i.e., unexpired). Similarly, when the receiver only has almanac data of the satellite and does not have any ephemeris, the almanac is selected. When the GPS receiver determines that it has both ephemeris data and almanac data (at step 801), it examines whether or not the ephemeris has expired (step 803). Unexpired ephemeris is selected over almanac data (step 804). At step 803, when the GPS receiver has both an expired ephemeris and almanac data of a satellite, the receiver needs to compare their week number value (step 805), taking into consideration whether or not a rollover event has occurred. Normally, a greater week number indicates a more recent reference time, except immediately after a rollover event. At the rollover event, because the week number has reached the maximum week number, it is reset to the lowest week number value. At step 806, if the week number of the ephemeris data is larger than the week number of the almanac data, the ephemeris data is selected (step 807). Otherwise, the almanac data is selected.

The selection procedure shown in FIG. 8 compares the age of an ephemeris and almanac data using only their respective week numbers. This is provided only for illustrative purpose. The actual age of an ephemeris or an almanac is provided by the combination of its week number and its reference time (toe or toa). When an ephemeris and an almanac both have the same week number, the one with the larger reference time is more recent.

The procedure of FIG. 8 may be further extended. For example, one may associate the respective ages of ephemeredes and almanac data, (e.g., down to the level of seconds) that would provide the same accuracies when used to calculate satellite positions and velocities. For example, a table may be provided relating position or velocity estimations with the ages of almanac and ephemeris data (e.g., in seconds or in weeks). In that case, based on the ages in seconds of an ephemeris and an almanac, one may be able to look up their respective accuracies in estimating satellite positions or velocities and determine therefrom which set of parameters should be used for the satellite position or velocity estimation. With such data, the comparison at step 806, for example, selects the ephemeris or almanac data according to a function that predicts the accuracies in positions and velocities calculated based on their respective ages. For example, in one application, the ephemeris data is selected when the age of the almanac exceeds the age of the ephemeris by 3 weeks.

The above detailed description is provided to illustrate specific embodiments of the present invention and is not intended to be limiting. Numerous modification and variations within the scope of the present invention are possible. The present invention is set forth in the following claims.

We claim:

1. In a GPS receiver, a method for storing satellite orbital parameters, comprising:
   receiving an ephemeris and almanac data of a satellite;
   comparing a week number and reference time associated with the ephemeris with a week number and reference time associated with the almanac data;

based on the comparison, selecting the more recent one of the ephemeris and the almanac data to be stored in a non-volatile memory of the GPS receiver; and retrieving from the non-volatile memory the stored more recent one of the ephemeris and almanac data to compile a list of visible satellites.

2. A method as in claim 1 wherein, for each satellite, only the more recent one of the ephemeris and the almanac data is stored in the non-volatile memory.

3. A method as in claim 1, wherein the non-volatile memory comprises a random access memory element.

4. A method as in claim 1 further comprising computing a position or a velocity of the satellite using the more recent one of the almanac data and the ephemeris.

5. A method as in claim 4, further comprising determining whether or not the satellite is visible to the GPS receiver based on the computing.

6. A method as in claim 1 wherein when only an ephemeris but not almanac data is available for the GPS receiver to compute a position or a velocity of a satellite, the GPS receiver computes the position or velocity of the satellite using the ephemeris.

7. A method as in claim 1 wherein when only an almanac data but not ephemeris data is available for the GPS receiver to compute a position or a velocity of a satellite, the GPS receiver computes the position or velocity of the satellite using the almanac.

8. A method as in claim 1 wherein when both almanac data and an ephemeris are available for the GPS receiver to compute a position or a velocity of a satellite, if the ephemeris data is unexpired, computing the position or velocity of the satellite using the ephemeris.

9. A method as in claim 1, wherein when both almanac data and an ephemeris are available for the GPS receiver to compute a position or a velocity of a satellite, if the ephemeris data has expired, computing the position or velocity of the satellite using the more recent one of the ephemeris and the almanac data.

10. A method as in claim 9, wherein the more recent one of the ephemeris and the almanac data is determined by comparing week numbers associated with the almanac data and the ephemeris.

11. A method as in claim 9, wherein the comparing takes into account any rollover event.

12. A method as in claim 9, wherein the ephemeris and the almanac data have the same reference time, computing the position or velocity of the satellite using the almanac data.

13. A method as in claim 1, wherein when the ephemeris expires, converting parameters in the ephemeris to parameters of almanac data.

14. A method as in claim 13, further comprising computing a position or a velocity of the satellite using the almanac data converted from an expired ephemeris.

15. A method as in claim 1, wherein the ages of almanac and ephemeredes are associated with accuracies of the satellite positions or velocities estimated from such ephemeredes and almanac, such that when both almanac data and an ephemeris are available for the GPS receiver to compute a satellite position or velocity, the satellite position or velocity is calculated using the ephemeris or the almanac data that would provide a higher accuracy.

16. A method as in claim 15, wherein the associations are compiled into a table relating satellite position or velocity estimation accuracies with the ages of the ephemeris and the almanac, and wherein the GPS receiver selects between the almanac or the ephemeris data based on the estimation accuracies associated with the ages of the almanac data and the ephemeris available.

17. A method as in claim 15, wherein the GPS receiver selects between the almanac data and the ephemeris according to whether or not the difference in ages between the almanac data and the ephemeris exceeds a predetermined threshold.

* * * * *

UNITED STATES PATENT AND TRADEMARK OFFICE
CERTIFICATE OF CORRECTION

PATENT NO. : 7,355,551 B2
APPLICATION NO. : 11/368917
DATED : April 8, 2008
INVENTOR(S) : Gang Xie et al.

It is certified that error appears in the above-identified patent and that said Letters Patent is hereby corrected as shown below:

Delete Figure 2, and replace Figure 2 as enclosed herewith.

Signed and Sealed this

Seventeenth Day of November, 2009

David J. Kappos
*Director of the United States Patent and Trademark Office*

FIG. 2